B. F. EMERY.
HAME AND TUG CONNECTION.
APPLICATION FILED MAR. 3, 1908.
911,650.
Patented Feb. 9, 1909.
2 SHEETS—SHEET 2.
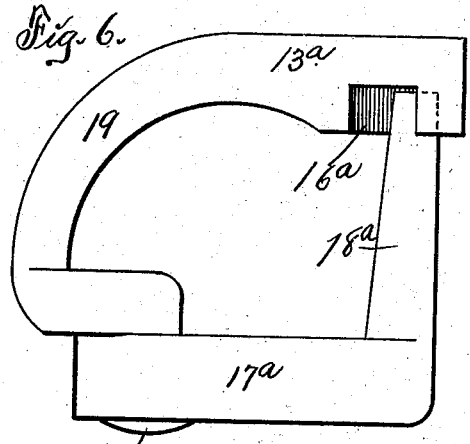
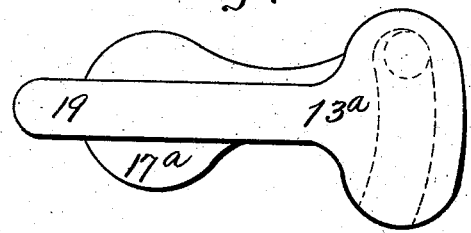
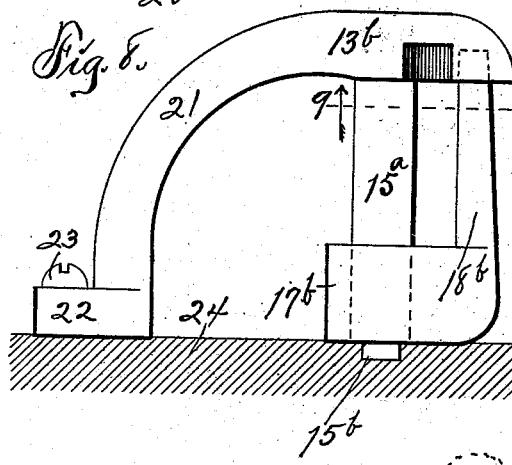
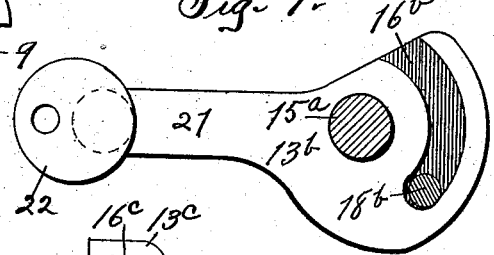
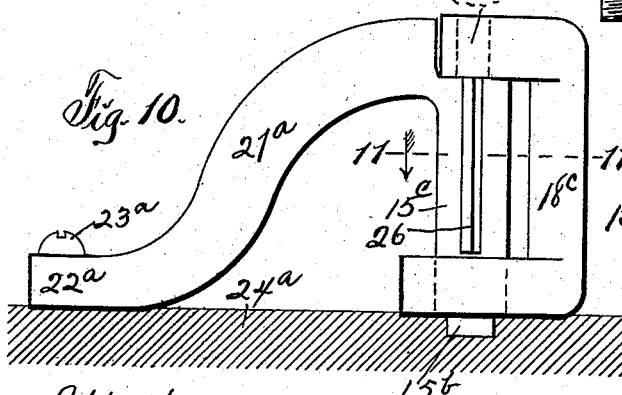
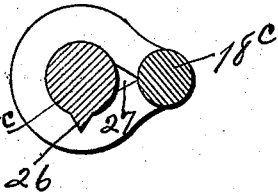
Attest:
Erle W Miller
C G Rosell
Inventor:
Benjamin F. Emery
By J. H. Swert
Atty
THE NORRIS PETERS CO., WASHINGTON, D. C.

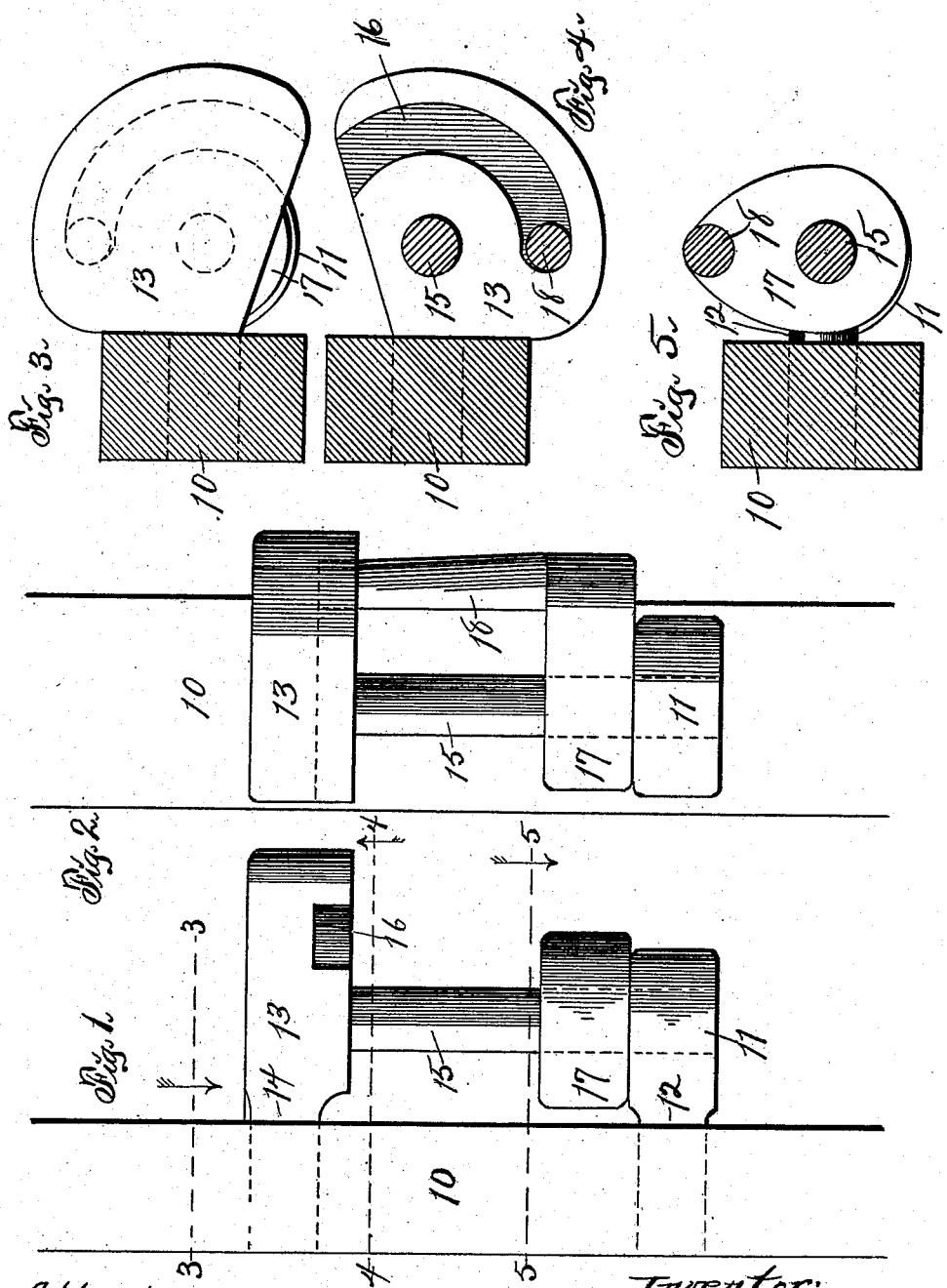

UNITED STATES PATENT OFFICE.

BENJAMIN F. EMERY, OF THAYER, IOWA.

HAME AND TUG CONNECTION.

No. 911,650.　　　　Specification of Letters Patent.　　　　Patented Feb. 9, 1909.

Application filed March 3, 1908. Serial No. 418,954.

*To all whom it may concern:*

Be it known that I, BENJAMIN F. EMERY, a citizen of the United States of America, and resident of Thayer, Union county, Iowa, have invented a new and useful Hame and Tug Connection, of which the following is a specification.

The object of this invention is to provide improved means for connecting a hame tug or trace to a hame or to a hameless collar.

A further object of this invention is to adapt the same principle of construction to a clevis and to the hold-back and check-rein portions of a harness.

My invention consists in the construction, arrangement and combination of elements hereinafter set forth, pointed out in my claims and illustrated by the accompanying drawing in which—

Figure 1 is a front elevation of the preferred form of my connecting device attached to a portion of a hame. Fig. 2 is a side elevation of the same. Fig. 3 is a cross-section on the indicated line 3—3 of Fig. 1. Fig. 4 is a cross-section on the indicated line 4—4 of Fig. 1. Fig. 5 is a cross-section on the indicated line 5—5 of Fig. 1. Fig. 6 is a side elevation illustrating the application of the device to a clevis and Fig. 7 is a plan of the same. Fig. 8 is a side elevation illustrating the invention applied to a hold-back and Fig. 9 is a cross-section on the indicated line 9—9 of Fig. 8. Fig. 10 is a side elevation illustrating a modified form of the device as applied to a hold-back and Fig. 11 is a cross-section on the indicated line 11—11 of Fig. 10. Fig. 12 is a side elevation illustrating the invention applied to a check-rein hook.

In the construction of the device as illustrated in Figs. 1, 2, 3, 4 and 5 the numeral 10 designates a support such as a hame or hameless collar. A bearing 11 is formed with a stem 12 adapted to be screwed into the hame 10 and also is formed with a vertical circular aperture as shown by dotted lines in Figs. 1 and 2. A head-block 13 is provided and is formed with a stem 14 adapted to be screwed into the hame 10 above the bearing 11. A shaft 15 connects the head-block 13 and bearing 11 and extends parallel with and at one side of the hame 10. The head-block 13 is formed with a segmental groove 16 concentric with the shaft 15 and opening to the lower face of said block. The forward end portion of the groove 16 is open at the forward margin of the head-block 13 and the rear end of said groove is closed in the rear portion of said head-block and directly to the rear of the shaft 15. An arm 17 is journaled on the shaft 15 and a stem 18 is formed on the outer end portion of said arm and extends upward parallel with the shaft. The upper end portion of the stem 18 enters the groove 16 in the head-block 13 and is adapted for travel therein and outside of said groove in rotation of the arm 17 on the shaft 15.

In practical use the arm 17 is rotated on the shaft 15 in such manner as to carry the stem 18 forwardly and out of the groove 16 in order that a hame-tug or trace (not shown) may be attached to said stem. Thereupon draft is applied to the hame-tug or trace and the stem 18 is drawn rearwardly and on an arc into and through the length of the groove 16, and in so doing the arm 17 is turned into the position shown. Thereafter the hame-tug or trace will maintain the desired connection with the stem 18 for the reason that said stem and the arm carrying the same cannot be turned forward sufficiently, by accidental means, to detach such connection.

In the construction shown in Figs. 6 and 7 a head-block $13^a$ is formed with an arm 19 curved from one end portion thereof and terminating in a stud 20. An arm $17^a$ is journaled on the stud 20 and said stud is riveted at its outer end to retain said arm. A stem $18^a$ is formed on the outer end portion of the arm $17^a$ and extends at right angles thereto. The free end of the stem $18^a$ enters a groove $16^a$ formed in the lower face of the block $13^a$ concentric with the stud 20. This device may be employed as a clevis and may be detached, for release of the devices connected thereby, by turning the arm $17^a$ on the stud 20 in such manner as to move the stem $18^a$ out of the groove $16^a$.

In the construction of the device shown in Figs. 8 and 9 a head-block $13^b$ is employed and an arm 21 is formed on and curves from said block. An ear 22 is formed on the opposite end of the arm 21 adapted to be connected by a bolt or screw 23 to a thill 24. A shaft $15^a$ is fixed at one end to the head-block $13^b$ and extends at right angles therefrom. The opposite end portion of the shaft $15^a$ is reduced in diameter to form a stud $15^b$ adapted to be seated in the thill 24 at the rear of the ear 22. An arm $17^b$ is journaled on the shaft $15^a$ and a stem $18^b$ is formed on and extends at right angles to the outer end portion of said arm. The upper end portion of the stem 18$^b$ enters a groove 16$^b$ formed in the lower face of the head-block 13$^b$ concentric with the shaft 15$^a$. The arm 17$^b$ may be moved rotatively on the shaft 15$^a$ to move the stem 18$^b$ out of the groove 16$^b$, and then a hold-back strap may be engaged over said stem and draft applied in such manner as to move the stem again into engagement with the groove. Thereafter the stem will be retained in the groove by the hold-back strap and will not become accidentally released therefrom.

In the construction of the device as shown in Figs. 10 and 11 an arm 21$^a$ is employed and is fixed at one end to a shaft 15$^c$ while the other end of said arm is formed as an ear 22$^a$ adapted to be attached by a bolt or screw 23$^a$ to a thill 24$^a$. The lower end portion of the shaft 15$^c$ is reduced in diameter to form a stud 15$^b$ adapted to be seated in a notch or recess in the thill at the rear of the ear 22$^a$. A stud 25 is formed on the upper end portion of the shaft 15$^c$. A yoke 18$^c$ is provided and the lower arm thereof is journaled on the lower end portion of the shaft 15$^c$ while the upper arm of said yoke is journaled on the stud 25. A spline or rib 26 is formed on and longitudinally of the shaft 15$^c$ and a notch 27 is formed in the lower arm of the yoke 18$^c$ adjacent the body of said yoke for the passage of said spline at times. In practical use the yoke 18$^c$ may be turned on its pivots until the notch 27 registers with the spline 26 and then said yoke may be lifted along the shaft 15$^c$ until the upper arm of the yoke is released from the stud 25. Thereupon a hold-back strap (not shown) can be applied to the yoke 18$^c$ and said yoke be repositioned as shown. In the position shown the yoke 18$^c$ is held against vertical movement by the spline 26.

In the construction of the device as shown in Fig. 12 a shaft 15$^d$ is provided and is formed with a laterally extending head 13$^c$. The head 13$^c$ is formed with a segmental groove 16$^c$ in its lower face concentric with the shaft and open at one end. A portion of the lower end of the shaft 15$^d$ is formed angular in cross-section and is adapted to be seated in an angular aperture of common form in a harness saddle (not shown). The lower extremity of the shaft 15$^d$ is reduced in diameter and threaded to receive a nut whereby the device may be mounted rigidly, yet removably, in the harness saddle. An arm 17$^c$ is journaled on the shaft 15$^d$ adjacent the angular portion thereof and a stem 18$^d$ is formed and extends at right angles from the outer portion of said arm. The upper end portion of the stem 18$^d$ is adapted for to and fro travel in the groove 16$^c$. In practical use the shaft 15$^d$ and its head 13$^c$ serve as a hook to be engaged by a check-rein or check-rein loop and the stem 18$^d$ serves as a keeper to prevent accidental release of the check-rein or loop.

I claim as my invention—

1. A device of the class described, comprising a head formed with a groove, a bearing fixed to said head and an angular member journaled to said bearing and formed with a stem entering said groove, the stem being parallel with the axis of articulation of the members.

2. A device of the class described, comprising a head formed with a segmental groove in one face and opening through one margin thereof, a bearing connected to said head and an angular member journaled on said bearing and extending within said groove, said angular member adapted to be moved rotatively out of said groove.

3. A device of the class described, comprising a head member formed with a segmental groove in one face, an angular member adapted to enter said groove at one end and pivotal connections between said members.

4. A device of the class described, comprising a shaft, a head member on said shaft formed with a segmental groove in one face concentric with said shaft, an arm pivoted on said shaft and a stem on said arm adapted to enter said groove.

5. A device of the class described, comprising a shaft, a head member on said shaft formed with a groove in one face, means for bracing said head member and shaft, an arm journaled on said shaft and a stem on said arm adapted to enter said groove.

6. A device of the class described, comprising a head member formed with a groove, a shaft on said head member, a bearing member connected to said shaft, means for supporting said head member and bearing member, an arm journaled on said shaft and a stem on said arm adapted to enter said groove.

Signed by me at Des Moines, Iowa, this 26th day of February, 1908.

BENJAMIN F. EMERY.

Witnesses:
THOMAS G. ORWIG,
S. C. SWEET.